(12) United States Patent
Oren et al.

(10) Patent No.: US 10,397,748 B2
(45) Date of Patent: Aug. 27, 2019

(54) METHODS AND APPARATUS FOR CELLULAR TECHNOLOGY-BASED IDENTIFICATION OF A REGISTERED INDIVIDUAL IN A VICINITY

(71) Applicant: AppCard, Inc., Wilmington, DE (US)

(72) Inventors: Amichay Oren, Tenafly, NJ (US); Yair Goldfinger, New York, NY (US); Idan Miron Warsawski, Lexington, MA (US)

(73) Assignee: AppCard, Inc., Wilmington, DE (US)

( * ) Notice: Subject to any disclaimer, the term of this patent is extended or adjusted under 35 U.S.C. 154(b) by 532 days.

(21) Appl. No.: 14/898,517

(22) PCT Filed: Jul. 17, 2014

(86) PCT No.: PCT/US2014/047001
§ 371 (c)(1),
(2) Date: Dec. 15, 2015

(87) PCT Pub. No.: WO2015/009915
PCT Pub. Date: Jan. 22, 2015

(65) Prior Publication Data
US 2016/0127872 A1    May 5, 2016

Related U.S. Application Data

(60) Provisional application No. 61/856,307, filed on Jul. 19, 2013.

(51) Int. Cl.
*H04W 4/60* (2018.01)
*H04W 8/18* (2009.01)
(Continued)

(52) U.S. Cl.
CPC .......... *H04W 4/029* (2018.02); *G06Q 20/202* (2013.01); *G06Q 30/0255* (2013.01);
(Continued)

(58) Field of Classification Search
CPC ......... H04W 4/029; H04W 4/60; H04W 4/04; H04W 8/18; H04W 48/14; H04W 60/00;
(Continued)

(56) References Cited

U.S. PATENT DOCUMENTS 5,778,315 A    7/1998 Proietti
6,496,694 B1 * 12/2002 Menon .................. H04W 84/14
                                                        455/424
(Continued)

FOREIGN PATENT DOCUMENTS

CA    2336092 A1 *  1/2000  ............. G06Q 30/02

OTHER PUBLICATIONS

International Search Report for PCT/US2014/047001, dated Jan. 30, 2015, 5 pages.
(Continued)

*Primary Examiner* — Ashford S Hayles
(74) *Attorney, Agent, or Firm* — Choate, Hall & Stewart LLP; William R. Haulbrook; Alexander D. Augst

(57) ABSTRACT

The present disclosure relates to systems and methods for identifying a plurality of mobile devices within a vicinity. The method include receiving, by a small cell base station, a connection request issued by a mobile device. The method include identifying a device identifier associated with the connection request and determining whether the device identifier is unique in light of a listing of previously recognized device identifiers.

18 Claims, 6 Drawing Sheets

(51) Int. Cl.
*G06Q 20/20* (2012.01)
*G06Q 30/02* (2012.01)
*H04L 29/08* (2006.01)
*H04W 12/08* (2009.01)
*H04W 4/029* (2018.01)
*H04W 48/02* (2009.01)
*H04W 48/14* (2009.01)
*H04W 60/00* (2009.01)
*H04W 4/04* (2009.01)
*H04W 8/20* (2009.01)
*H04W 84/04* (2009.01)
*H04W 88/06* (2009.01)
*H04W 88/10* (2009.01)

(52) U.S. Cl.
CPC ............. *H04L 67/22* (2013.01); *H04W 4/04* (2013.01); *H04W 4/60* (2018.02); *H04W 8/18* (2013.01); *H04W 12/08* (2013.01); *H04W 48/02* (2013.01); *H04W 48/14* (2013.01); *H04W 60/00* (2013.01); *H04W 8/20* (2013.01); *H04W 84/045* (2013.01); *H04W 88/06* (2013.01); *H04W 88/10* (2013.01)

(58) Field of Classification Search
CPC ..... H04W 48/02; H04W 12/08; H04W 88/10; H04W 88/06; H04W 8/20; H04W 84/045; H04L 67/22; G06Q 30/0255; G06Q 20/202
USPC .......................................................... 705/21
See application file for complete search history.

(56) References Cited

U.S. PATENT DOCUMENTS

| | | | | |
|---|---|---|---|---|
| 7,688,820 B2* | 3/2010 | Forte | ................. | H04L 29/06027 370/230 |
| 8,000,719 B1* | 8/2011 | Lambert | ................. | H04W 64/00 455/456.1 |
| 8,107,957 B1* | 1/2012 | O'Neil | ................. | H04M 3/42229 370/352 |
| 8,280,408 B2* | 10/2012 | Ruckart | ................. | G06Q 30/02 455/456.3 |
| 8,626,593 B2 | 1/2014 | Goldfinger et al. | | |
| 8,849,199 B2* | 9/2014 | Shrum, Jr. | ....... | H04N 21/25808 455/41.2 |
| 9,355,408 B2* | 5/2016 | Jung | ................. | G06Q 30/0267 |
| 9,799,061 B2* | 10/2017 | Ivanov | ................. | G06Q 30/06 |
| 2002/0198851 A1* | 12/2002 | Hashimoto | ............ | G06Q 30/02 705/400 |
| 2003/0126039 A1* | 7/2003 | Kiyose | ................. | G06F 21/6218 709/229 |
| 2004/0140353 A1* | 7/2004 | Ishizuka | ................. | G06Q 30/02 235/383 |
| 2004/0192339 A1* | 9/2004 | Wilson | ................. | H04W 64/00 455/456.1 |
| 2005/0038876 A1* | 2/2005 | Chaudhuri | ............ | G06Q 10/10 709/219 |
| 2005/0257055 A1* | 11/2005 | Anderson | ........... | H04L 63/0442 713/170 |
| 2006/0253453 A1* | 11/2006 | Chmaytelli | ........... | G06Q 30/02 |
| 2007/0281692 A1* | 12/2007 | Bucher | ................. | G06Q 30/02 455/435.1 |
| 2008/0102794 A1* | 5/2008 | Keevill | ................. | H04L 12/5692 455/411 |
| 2008/0207170 A1* | 8/2008 | Khetawat | ........... | H04W 60/005 455/411 |
| 2008/0227467 A1* | 9/2008 | Barnes | ................. | G06Q 30/0259 455/456.2 |
| 2009/0157472 A1* | 6/2009 | Burazin | ................. | G06Q 30/02 705/14.57 |
| 2009/0181653 A1* | 7/2009 | Alharayeri | ............. | H04W 4/02 455/414.1 |
| 2009/0262682 A1 | 10/2009 | Khetawat et al. | | |
| 2009/0285166 A1* | 11/2009 | Huber | ................. | G06Q 20/1235 370/329 |
| 2009/0298470 A1* | 12/2009 | Huber | ................. | H04L 63/101 455/411 |
| 2010/0070417 A1* | 3/2010 | Flynn | ................. | H04W 12/06 705/51 |
| 2010/0093333 A1* | 4/2010 | Friedenthal | ........... | G06Q 30/02 455/418 |
| 2010/0159945 A1 | 6/2010 | Brisebois | | |
| 2010/0280904 A1* | 11/2010 | Ahuja | ................. | G06Q 30/02 705/14.58 |
| 2010/0285820 A1 | 11/2010 | Jozwiak et al. | | |
| 2011/0034182 A1* | 2/2011 | Issa | ................. | H04W 4/02 455/456.3 |
| 2011/0064021 A1* | 3/2011 | Patini | ................. | H04W 40/248 370/328 |
| 2011/0086637 A1* | 4/2011 | Han | ................. | H04W 48/08 455/435.1 |
| 2011/0116477 A1* | 5/2011 | Wu | ................. | H04L 63/104 370/331 |
| 2011/0143740 A1* | 6/2011 | Nam | ................. | H04W 48/08 455/419 |
| 2011/0173074 A1* | 7/2011 | Shinozaki | ............. | G06Q 30/02 705/14.58 |
| 2011/0178863 A1* | 7/2011 | Daigle | ................. | G06Q 30/0231 705/14.31 |
| 2011/0223920 A1* | 9/2011 | Wang | ................. | H04W 8/26 455/444 |
| 2011/0244857 A1* | 10/2011 | Hsieh | ................. | H04L 63/101 455/435.1 |
| 2011/0319079 A1 | 12/2011 | Nakata et al. | | |
| 2012/0005727 A1* | 1/2012 | Lee | ................. | H04L 9/321 726/3 |
| 2012/0036015 A1* | 2/2012 | Sheikh | ................. | G06Q 30/02 705/14.54 |
| 2012/0094648 A1* | 4/2012 | Fan | ................. | H04W 4/021 455/422.1 |
| 2012/0130821 A1* | 5/2012 | Frankel | ................. | G06Q 30/02 705/14.67 |
| 2012/0135713 A1* | 5/2012 | Lee | ................. | H04W 8/02 455/411 |
| 2012/0140749 A1* | 6/2012 | Caldwell | ............. | H04W 48/18 370/338 |
| 2012/0190386 A1* | 7/2012 | Anderson | ........... | G01C 15/04 455/456.3 |
| 2012/0238301 A1 | 9/2012 | Morrison | | |
| 2012/0246468 A1* | 9/2012 | Gabor | ................. | H04L 63/0823 713/156 |
| 2012/0309393 A1* | 12/2012 | Shinojima | ........... | H04W 60/00 455/435.1 |
| 2012/0315901 A1* | 12/2012 | Un | ................. | H04W 4/04 455/435.1 |
| 2012/0316953 A1* | 12/2012 | Ramchandani | ..... | G06K 19/0723 705/14.39 |
| 2013/0030915 A1* | 1/2013 | Statler | ................. | G06Q 30/02 705/14.54 |
| 2013/0041755 A1* | 2/2013 | Ivanov | ................. | G06Q 30/06 705/14.64 |
| 2013/0080578 A1* | 3/2013 | Murad | ................. | H04N 21/214 709/217 |
| 2013/0095831 A1 | 4/2013 | Lee et al. | | |
| 2013/0110637 A1* | 5/2013 | Bott | ................. | G06F 16/9574 705/14.64 |
| 2013/0117096 A1* | 5/2013 | Klein | ................. | G06Q 30/0208 705/14.39 |
| 2013/0170348 A1* | 7/2013 | Luna | ................. | H04L 47/20 370/230.1 |
| 2013/0244685 A1* | 9/2013 | Dempski | ............. | H04L 67/306 455/456.1 |
| 2013/0316708 A1* | 11/2013 | MacPherson | ........... | H04W 4/02 455/435.1 |
| 2014/0108149 A1* | 4/2014 | Jabara | ................. | G07F 17/3218 705/14.64 |

(56) References Cited

U.S. PATENT DOCUMENTS

| | | | | |
|---|---|---|---|---|
| 2014/0113653 A1* | 4/2014 | Wendling | ............ | H04L 41/0893 455/456.1 |
| 2014/0136312 A1* | 5/2014 | Saksena | ............ | G06Q 30/0261 705/14.39 |
| 2014/0141743 A1* | 5/2014 | Shaw | .................... | H04W 4/029 455/405 |
| 2014/0274048 A1* | 9/2014 | Lavi | .................... | H04W 64/006 455/435.1 |
| 2014/0279014 A1* | 9/2014 | Roka | ................. | G06Q 30/0261 705/14.58 |
| 2014/0321429 A1* | 10/2014 | Enomoto | .......... | H04W 36/0055 370/331 |
| 2014/0330645 A1* | 11/2014 | Craft | ................. | G06Q 30/0255 705/14.53 |
| 2014/0358666 A1* | 12/2014 | Baghaie | ............ | G06Q 30/0267 705/14.41 |
| 2015/0051975 A1* | 2/2015 | Kadous | .............. | G06Q 30/0261 705/14.58 |
| 2015/0066802 A1* | 3/2015 | Goulart | .................. | H04W 4/21 705/346 |
| 2015/0170209 A1* | 6/2015 | Smith | .................... | G06Q 30/02 705/14.64 |
| 2015/0235161 A1* | 8/2015 | Azar | .............. | G06Q 10/063114 705/7.15 |
| 2015/0254704 A1* | 9/2015 | Kothe | .................... | G06Q 30/06 705/14.26 |
| 2015/0327063 A1* | 11/2015 | Van Phan | ................ | H04W 4/70 455/411 |
| 2015/0363816 A1* | 12/2015 | Poglitsch | ........... | G06Q 30/0235 705/14.35 |
| 2016/0005077 A1* | 1/2016 | McDevitt | ........... | G06Q 30/0208 705/14.58 |
| 2017/0091850 A1* | 3/2017 | Alvarez | ............. | G06Q 30/0633 |
| 2018/0041602 A1* | 2/2018 | Gorti | ..................... | G06Q 30/02 |
| 2018/0103379 A1* | 4/2018 | Smith | ................... | H04W 16/14 |

OTHER PUBLICATIONS

Written Opinion, PCT/US2014/047001, dated Jan. 30, 2015, 11 pages.

* cited by examiner

METHODS AND APPARATUS FOR CELLULAR TECHNOLOGY-BASED IDENTIFICATION OF A REGISTERED INDIVIDUAL IN A VICINITY

RELATED APPLICATIONS

The present application claims priority to and the benefit of U.S. Provisional Patent Application Ser. No. 61/856,307, filed Jul. 19, 2013, the content of which is hereby incorporated by reference herein in its entirety.

BACKGROUND

Small cell base stations are low power base stations that connect to a cellular service provider's network to extend the service provider network to a small area that would otherwise be subject to poor or no cellular signal coverage. A small cell base station, often referred to as a femtocell, connects to the cellular service provider's network through broadband communication (e.g., cable or DSL). When a user's mobile device enters an area where coverage is provided by a femtocell, the mobile device switches over from the macro cell coverage to the femtocell coverage in order to receive a stronger cellular signal. The small cell base station is part of both the local area network present in its installed location and the cellular provider's service network. A small cell base station also allows communication between mobile devices and other devices located in the small cell base station's coverage zone over the local area network. Small cell base stations can be configured to only allow certain registered users to use the small cell signal.

In some embodiments, the small cell base station may be a software defined radio that allows mobile devices to be used as endpoints in a Voice over IP (VOIP) network. Instead of forwarding call traffic through to an operator's mobile switching center, the software based small cell may deliver calls to a VOIP switch. This VOIP switch can be installed on the same processor used to run the software based small cell transceiver itself, forming a self-contained cellular network in a single computing device system. Multiple software based small cell transceivers can also share a common VOIP switch to form VOIP networks composed of individual computing device based cellular networks with a wider area coverage than the individual networks.

SUMMARY

In one aspect, the present disclosure describes a method for identifying a plurality of cellular devices within a vicinity over time, the method including receiving, by a small cell device, a connection request issued by a mobile device via cellular transmission. The method may identify, by using a processor of the small cell device, a device identifier associated with the connection request. The processor may determine that the device identifier is unique in light of a listing of previously recognized device identifiers.

Upon determining that the device identifier is unique, the method may include adding, by the processor, the device identifier to the listing of previously recognized device identifiers by associating the device identifier with at least one of a timestamp and an expiration. The method may provide, to the mobile device, a connection decline message in response to the cellular transmission.

In some implementations, the processor may identify a customer associated with the device identifier. Identifying the customer may include providing the device identifier to a remote computing device via a network. Such a network may be a cellular network and the remote computing device may be a remote small cell device. Providing such a device identifier may include providing location information identifying a location of at least one of the mobile device and the small cell device. The location information may include an identifier associated with the small cell device.

In some implementations, customer identification may include issuing a request to a cellular provider to convert the device identifier to a telephone number or another unique identifier.

In some implementations, the method may include providing a request for telephone number or unique identifier to the mobile device prior to providing the connection decline and receiving a device telephone number from the mobile device. A small cell device may request identification information from the mobile device. The customer identification may involve cross-referencing of the telephone number or the unique identifier with a customer database. In some implementations, the method may include removing, by the processor, the device identifier from the listing of previously recognized device identifiers after a predetermined time related to at least one of the timestamp and the expiration has elapsed.

In another aspect, the present disclosure describes a method for identifying a plurality of mobile devices within a vicinity. The method includes receiving, by a processor of a small cell base station (e.g., a femtocell station, a GSM base station, or a base transceiver station (BTS)), a connection request issued by a mobile device via cellular transmission. The identifying, by the processor, a device identifier (e.g., an international mobile subscriber identity (IMSI) or mobile identification number (MIN)) from the connection request. The device identifier is associated with the mobile device that issued the connection request. The method includes determining, by the processor, whether the device identifier is unique in light of a listing of previously recognized device identifiers. In some embodiments, listing of previously recognized device identifiers is maintained at the small cell base station (e.g., as a blocked device list). In other embodiments, the listing is maintained at a remote server that is accessible to the small cell base station via network access.

The method includes, responsive to determining that the device identifier is unique, adding, by the processor, the device identifier to the listing of previously recognized device identifiers, where adding the device identifier includes associating the device identifier with a timestamp or an expiration. In some embodiments, responsive to determining that the device identifier is unique, the method includes causing, via the processor, a promotional offer to be sent to the mobile device. The processor may transmit the device identifier to a server that uses the device identifier to identify a customer or user account (e.g., email, social media, cellular, broadband, etc.) that is associated with the mobile device or the user of the mobile device.

In some embodiments, the method includes clearing the listing of previously recognized device identifiers to different multiple visits by a user of the mobile device to the vicinity (e.g., using the timestamp). In other embodiments, the expiration information is employed to identify the multiple different visits by the various mobile devices.

In some embodiments, the method includes providing, to the mobile device, in response to the cellular transmission, a connection decline.

In some embodiments, the method includes receiving, by the small cell base station, a second connection request issued by the mobile device. The method may include identifying, by the processor, whether the device identifier of the second connection request is located within the listing of previously recognized device identifiers and providing, to the mobile device, in response to the second connection request, a second connection decline.

In some embodiments, the method includes causing, by the processor, an identification of a telephone number of the mobile device associated with the device identifier. The identified telephone number may be employed to send a promotional offer to the mobile device. In some embodiments, the device identifier includes an international mobile subscriber identity (IMSI) or mobile identification number (MIN).

In some embodiments, the identification is the result of the processor matching records, on hand (e.g., locally stored on the small cell base station), to correlate the device identifiers to known customers. In other embodiments, a request having the device identifier is issued to a cellular provider for conversion of the device identifier to a telephone number. In other embodiments, the base station provides the device identifier, via a network, to a remote computing device located within the same network as the small cell base station in which the remote computing device has a database of device identifiers associated to customer's identity, telephone number, or contact information. In some embodiments, the network may be a cellular network. The device identifier may be employed by the remote computing device to determine the customer identity from a database indexed by the device identifier.

In some embodiments, the remote computing may be another small cell base station.

In some embodiments, the small cell base station provides the location information of the small cell base station and the device identifier to one or more servers. The servers may employ the information, for example, to send promotion material to customer when in vicinity of the small cell base station or to track the customer's traffic pattern. The location information may be an identifier associated with the small cell base station or may be mobile location information (e.g., determined via GPS or MPS).

In some embodiments, after a predetermined time related to the at least one of the timestamp and the expiration has elapsed, the method includes removing, by the processor, the device identifier from the listing of previously recognized device identifiers.

In another aspect, the present disclosure describes a mobile-device identification cell (e.g., femtocell station, a GSM base station, or a base transceiver station (BTS)) for identifying a plurality of mobile devices within a vicinity. The mobile-device identification cell includes a processor and memory having instructions thereon, in which the instructions, when executed by the processor, cause the processor to receive a connection request issued by a mobile device via cellular transmission. The instructions further cause the processor to identify a device identifier from the connection request. The device identifier is associated with the mobile device that issued the connection request.

The instructions further cause the processor to determine whether the device identifier is unique in light of a listing of previously recognized device identifiers. In some embodiments, listing of previously recognized device identifiers is maintained at the small cell base station (e.g., as a blocked device list). In other embodiments, the listing is maintained at a remote server that is accessible to the small cell base station via network access. In some embodiments, the instructions, when executed, further cause a promotional offer to be sent to the mobile device if the device identifier is determined to be unique. The processor may transmit the device identifier to a server that uses the device identifier to identify a customer or user account (e.g., email, social media, cellular, broadband, etc.) that is associated with the mobile device or the user of the mobile device.

The instructions further cause the processor to, responsive to determining that the device identifier is unique, add the device identifier to the listing of previously recognized device identifiers, where adding the device identifier includes associating the device identifier with at least one of a timestamp and an expiration. In some embodiments, the listing of previously recognized device identifiers is cleared (e.g., by the processor of the base station or a remote server) to different multiple visits by a user of the mobile device to the vicinity (e.g., using the timestamp). In other embodiments, the expiration information is employed to identify the multiple different visits by the various mobile devices.

In some embodiments, the instructions further cause the processor to provide, to the mobile device, in response to the cellular transmission, a connection decline.

In some embodiments, the instructions further cause the processor to cause an identification of a telephone number of the mobile device associated with the device identifier. The identified telephone number may be employed to send a promotional offer to the mobile device. In some embodiments, the device identifier includes an international mobile subscriber identity (IMSI) or mobile identification number (MIN).

In some embodiments, the identification is the result of the processor matching records, on hand (e.g., locally stored on the small cell base station), to correlate the device identifiers to known customers. In other embodiments, a request having the device identifier is issued to a cellular provider for conversion of the device identifier to a telephone number. In other embodiments, the base station provides the device identifier, via a network, to a remote computing device located within the same network as the small cell base station in which the remote computing device has a database of device identifiers associated to customer's identity, telephone number, or contact information. In some embodiments, the network may be a cellular network. The device identifier may be employed by the remote computing device to determine the customer identity from a database indexed by the device identifier. In some embodiments, the remote computing may be another small cell base station.

In some embodiments, the small cell base station provides the location information of the small cell base station and the device identifier to one or more servers. The servers may employ the information, for example, to send promotion material to customer when in vicinity of the small cell base station or to track the customer's traffic pattern. The location information may be an identifier associated with the small cell base station or may be mobile location information (e.g., determined via GPS or MPS).

In some embodiments, the instructions further cause the processor to, after a predetermined time related to the at least one of the timestamp and the expiration has elapsed, remove the device identifier from the listing of previously recognized device identifiers.

In some embodiments, the instructions further cause the processor to receive, by the small cell base station, a second connection request issued by the mobile device. The instructions further cause the processor to identify whether the device identifier of the second connection request is located within the listing of previously recognized device identifiers and providing, to the mobile device, in response to the second connection request, a second connection decline.

In another aspect, the present disclosure describes a non-transitory computer readable medium having instructions stored thereon, wherein the instructions, when executed by a processor, cause the processor to identify a plurality of mobile devices within a vicinity. The instructions cause the processor to receive a connection request issued by a mobile device via cellular transmission. The instructions further cause the processor to identify a device identifier from the connection request, the device identifier being associated with the mobile device that issued the connection request.

The instructions further cause the processor to determine whether the device identifier is unique in light of a listing of previously recognized device identifiers. In some embodiments, listing of previously recognized device identifiers is maintained at the small cell base station (e.g., as a blocked device list). In other embodiments, the listing is maintained at a remote server that is accessible to the small cell base station (e.g., femtocell station, a GSM base station, or a base transceiver station (BTS)) via network access.

The instructions further cause the processor to, responsive to determining that the device identifier is unique, add the device identifier to the listing of previously recognized device identifiers, where adding the device identifier includes associating the device identifier with at least one of a timestamp and an expiration. In some embodiments, the listing of previously recognized device identifiers is cleared (e.g., by the processor of the base station or a remote server) for different multiple visits by a user of the mobile device to the vicinity. In other embodiments, the expiration information is employed to identify the different visits by the various mobile devices.

In some embodiments, the instructions, when executed, further cause a promotional offer to be sent to the mobile device if the device identifier is determined to be unique. The processor may transmit the device identifier to a server that uses the device identifier to identify a customer or user account (e.g., email, social media, cellular, broadband, etc.) that is associated with the mobile device or the user of the mobile device.

In some embodiments, the instructions further cause the processor to provide, to the mobile device, in response to the cellular transmission, a connection decline.

In some embodiments, the instructions further cause the processor to cause an identification of a telephone number of the mobile device associated with the device identifier. The identified telephone number may be employed to send a promotional offer to the mobile device. In some embodiments, the device identifier includes an international mobile subscriber identity (IMSI) or mobile identification number (MIN).

In some embodiments, the identification is the result of the processor matching records, on hand (e.g., locally stored on the small cell base station), to correlate the device identifiers to known customers. In other embodiments, a request having the device identifier is issued to a cellular provider for conversion of the device identifier to a telephone number. In other embodiments, the base station provides the device identifier, via a network, to a remote computing device located within the same network as the small cell base station in which the remote computing device has a database of device identifiers associated to customer's identity, telephone number, or contact information. In some embodiments, the network may be a cellular network. The device identifier may be employed by the remote computing device to determine the customer identity from a database indexed by the device identifier. In some embodiments, the remote computing may be another small cell base station.

In some embodiments, the small cell base station provides the location information of the small cell base station and the device identifier to one or more servers. The servers may employ the information, for example, to send promotion material to customer when in vicinity of the small cell base station or to track the customer's traffic pattern. The location information may be an identifier associated with the small cell base station or may be mobile location information (e.g., determined via GPS or MPS).

In some embodiments, the instructions further cause the processor to, after a predetermined time related to the at least one of the timestamp and the expiration has elapsed, remove the device identifier from the listing of previously recognized device identifiers.

In some embodiments, the instructions further cause the processor to receive, by the small cell base station, a second connection request issued by the mobile device. The instructions further cause the processor to identify whether the device identifier of the second connection request is located within the listing of previously recognized device identifiers and providing, to the mobile device, in response to the second connection request, a second connection decline.

In another aspect, the present disclosure describes a non-transitory computer readable medium having instructions (e g, running on a customer traffic analysis server) stored thereon, where the instructions, when executed by a processor, cause the processor to receive, via a network, from a small cell base station (e.g., femtocell station, a GSM base station, or a base transceiver station (BTS)), a communication indicative of a mobile device being within vicinity of the small cell base station. The communication includes (i) mobile device identification information of the mobile device having entered the vicinity of the small cell base station and (ii) location information of the small cell base station or the mobile device. In some embodiments, the communication further includes a timestamp corresponding to a time of visit (e.g., corresponding to the entry of the mobile device to the vicinity of the small cell base station). The mobile device identification information has been retrieved from a connection request received from the mobile device at the small cell base station.

The instructions further cause the processor to store, as current visit information of the mobile device or customer associated with the mobile device, the location information and the mobile device identification information. The instructions further cause the processor to identify one or more prior visit information corresponding to the mobile device or the customer associated with the mobile device. A local database of prior visit information, or a server maintaining the database, for example, may be accessed and the prior visit information associated to the customer, mobile device, or device identifier are retrieved. The instructions further cause the processor to determine a traffic pattern of the mobile device or the customer associated with the mobile device using at least in part on the one or more prior visit information and the current visit information. The traffic pattern corresponds to a predetermined time window. The instructions further cause the processor to prepare a report comprising the traffic pattern.

In some embodiments, the traffic pattern include one or more visits by the mobile device to two or more locations associated with locations of a plurality of small base cell stations. In some embodiments, the two or more locations includes two or more retail locations. In some embodiments, the two or more locations are located within a region selected from the group consisting of a shopping mall, an amusement park, a campgrounds, a museum, a retail store, and an event center.

In another aspect, the present disclosure describes a method for tracking customer traffic at a given location. The method includes receiving, via a processor of a computing device, via a network connection with a small cell base station (e.g., femtocell station, a GSM base station, or a base transceiver station (BTS)), a communication indicative of a mobile device being within vicinity of the small cell base station. The communication includes (i) mobile device identification information of the mobile device having entered the vicinity of the small cell base station and (ii) location information of the small cell base station or the mobile device. In some embodiments, the communication includes a timestamp corresponding to a time of the visit (e.g., corresponding to the entry of the mobile device to the vicinity of the small cell base station). The mobile device identification information has been retrieved from a connection request received from the mobile device at the small cell base station.

The method includes storing (via the processor), as current visit information of the mobile device or customer associated with the mobile device, the location information and the mobile device identification information. The method includes identifying, via the processor, one or more prior visit information corresponding to the mobile device or the customer associated with the mobile device. A local database of prior visit information, or a server maintaining the database, for example, may be accessed and the prior visit information associated to the customer, mobile device, or device identifier are retrieved. The method includes determining, via the processor, a traffic pattern of the mobile device or the customer associated with the mobile device using at least in part on the one or more prior visit information and the current visit information. The traffic pattern corresponds to a predetermined time window. The method includes preparing, via the processor, a report comprising the traffic pattern.

In some embodiments, the traffic pattern include one or more visits by the mobile device to two or more locations associated with locations of a plurality of small base cell stations. In some embodiments, the two or more locations includes two or more retail locations. In other embodiments, the two or more locations are located within a region selected from the group consisting of a shopping mall, an amusement park, a campgrounds, a museum, a retail store, and an event center.

In another aspect, the present disclosure describes a method for presenting marketing offers to potential customers upon a given customer entering vicinity of a small cell base station (e.g., femtocell station, a GSM base station, or a base transceiver station (BTS)). The method includes receiving, via a processor of a computing device, via a network connection with a small cell base station, a communication indicative of the customer having entered the vicinity of the small cell base station. The communication includes mobile device identification information of the mobile device and location information of the small cell base station. The mobile device identification information was retrieved from a connection request received from the mobile device at the small cell base station. The method includes identifying, by the processor, customer information associated with the mobile device identification information. The method includes storing, by the processor, as visit information of a customer at a given location associated with the location information, the identified customer information. The method includes identifying, by the processor, at least one offer, where the offer is selected based on the customer information or the given location. The method includes providing, for review by the customer corresponding to the customer information, the at least one offer.

In some embodiments, the method includes providing the offer a point of sale device associated with the given location. In some embodiments, the method includes determining, by the processor, a communication channel associated with the customer information and providing the offer via the communication channel. In some embodiments, the communication channel is transmitted through a mobile application operating on the mobile device.

In one aspect, the present disclosure describes a system for identifying mobile devices within a vicinity of a given location. The system includes a number of small cell base stations and remote central processing system.

The small cell base stations includes a memory having instructions stored thereon, where the instructions, when executed by a processor of the respective small cell base station, cause the processor to receive a connection request to the small cell base station issued by a mobile device within vicinity of the small cell base station via cellular transmission. The instructions further cause the processor to identify a device identifier from the connection request in which the device identifier is associated with the connection request. The instructions further cause the processor to determine whether the device identifier is unique in light of a listing of previously recognized device identifiers. The instructions further cause the processor to, responsive to determining the device identifier is unique, add the device identifier to the listing of previously recognized device identifiers, where adding the device identifier includes associating the device identifier with at least one of a timestamp and an expiration. In some embodiments, the instructions further cause the processor to provide, to the mobile device, in response to the cellular transmission, a connection decline. The instructions further cause the processor to provide, via a network operatively linked to a remote central processing system, the device identifier.

The remote central processing system includes a memory having instructions stored thereon, where the instructions, when executed by a processor of the central processing system, cause the central processing system to receive, via the network, a plurality of communications from the small cell base stations. Each of the communications includes (i) the device identifier of a given mobile device having entered the vicinity of a given small cell base station that transmitted the communication and (ii) location information of the given small cell base station.

In some embodiments, the instructions further cause the processor to identify, for each of the plurality of communications, mobile device information identification or customer information associated with the mobile device identification information. In some embodiments, the instruction further cause the processor to store, as visit information corresponding to a location associated with the location information, the customer information.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
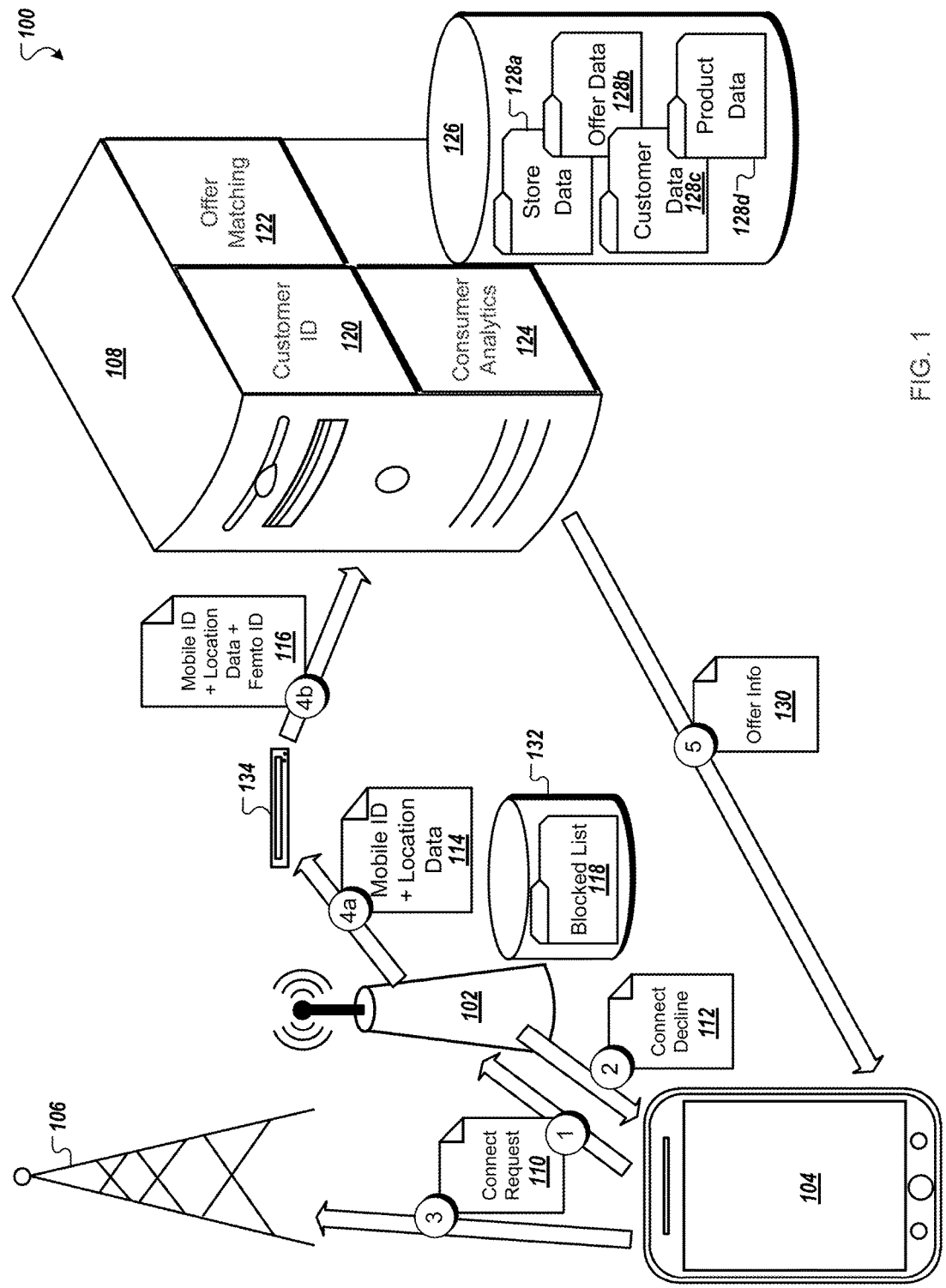
FIG. 1 is a block diagram of an example system for collecting and manipulating user data using a small cell base station.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Throughout the description, where apparatus, devices, and systems are described as having, including, or comprising specific components, or where processes and methods are described as having, including, or comprising specific steps, it is contemplated that, additionally, there are apparatus, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

As used herein, a small cell base station is a small, low-power cellular communication device configured to detect a mobile user device. A small cell base station, for example, may be similar to a femtocell station typically designed for user in a home or a business, which is designed to allow service providers to extend their service coverage indoors or at the cell edge, especially where cellular coverage may be limited or unavailable. The small cell base station may be configured to connect to a wired or wireless network (e.g., via wireless Ethernet bridge, Bluetooth®, WiFi™, etc.) and/or a cellular provider's network. The small cell base station is configured to detect and communicate with multiple mobile user devices. In certain implementations, the small cell base station is further configured to communicate with other cellular base stations. The small cell base station may be connected to a router that allows it to communicate with a remote server over a network such as the Internet. In certain implementations, the small cell base station also includes a memory unit.

A small cell base station can be used to detect the presence of a mobile user device that roams into the small cell's service area. Once a mobile user device roams into the small cell coverage area, the mobile user device automatically attempts to connect to the small cell base station and switch over its connection from the cellular service provider's macro cell to the small cell. The small cell base station can identify the mobile device attempting to connect to it from the connect request. The small cell base station, in some implementations, can also detect the location of the mobile user device within its coverage area.

In some implementations, a range of the small cell base station is configurable, for example to cover substantially the region of a retail location or other entity area (e.g., ticket counter of a sporting arena, dinosaur room of the science museum, etc.). The range of the small cell base station, in some examples, may include up to 10 feet, up to 50 ft, up to 200 ft, or over 400 ft). For example, to identify a particular user upon approach to a point of sale device, the range may be selected to be within 10 or even 5 feet, while detection of a passerby at a convenience store may include the range within the store as well as a circumference surrounding the store.

In some implementations, the range of the small cell base station is configured by a system administrator of the small cell base station to be limited to a threshold amount of signal strength. For example, a system administrator may program the small cell base station to detect any mobile device communication that is received with a certain amount of signal strength. The small cell base station may ignore any other received communication from mobile devices with a signal strength less than the preset threshold. This ensures the integrity of the communication between the small cell base station and the mobile devices that are transmitting data to the small cell base station with signal strengths above the preset threshold.

Other devices within range of the small cell base station, in some implementations, transmits data to the mobile user device using the wireless network fostered by the small cell base station. For example, the small cell base station can forward data from a server with promotional messages to a mobile user device that the small cell base station has detected has entered its coverage zone. For instance, by detecting that a particular user device has wandered into the store covered by the small cell base station, the small cell base station may report the mobile user device's presence to an online server. The online server may forward promotional messages to the mobile user device via the small cell base station to catch the mobile user device user's attention and attract the user into the store. In some implementations, the online server forwards promotional messages to the mobile user device through e-mail, text message, or a mobile application notification that could be received over a wireless or cellular connection.

Additionally, in some implementations, a network of small cell base stations is deployed within a larger region. For example, a network of small cell base stations may be used to monitor the traffic pattern of customers traversing an area covered by the network of small cell base stations. Such traffic information may be reported to an online server that can analyze such traffic patterns and provide a customized message to the mobile user device based on his traffic pattern. In the circumstance of a network of small cell base stations, in some implementations, the individual base stations is capable of communicating between each other, for example, to reduce range overlap, forward information regarding detected device identifiers, and/or distribute configuration or other messages supplied by a controlling computer such as a master small cell base station or other computing device.

Turning to FIG. 1, block diagram of an example system 100 for collecting and manipulating user data includes a small cell base station 102 to detect the presence of and identify a mobile user device 104. The small cell base station 102, in some implementations, is configured to communicate mobile device identifiers and location data to an analysis server 108. The mobile user device 104 may be denied service by the small cell base station 102, causing the mobile user device 104 to remain connected to a cellular network (e.g., via cell tower 106).

According to some embodiments, mobile device 104 detects the presence of a small cell base station 102 as soon as mobile device 104 enters within communication range of small cell base station 102. Upon detecting the presence of small cell base station 102, mobile device 104 transmits a connect request message 110 to small cell base station 102. The connect request message 110 transmitted to the small cell base station 102 may include the device identifier of mobile device 104. For example, a mobile telephone may transmit its international mobile subscriber identity (IMSI) or mobile identification number (MIN) to small cell base station 102 upon detecting that it is within range of base station 102.

In some embodiments, mobile device 104 may transmit connect request 110 to base station 102 on a single frequency. Alternatively, mobile device 104 may transmit connect request 110 to base station 102 on multiple frequencies. In certain implementations, mobile device 104 transmits precise location data of the mobile device 104 such as Global Positioning System (GPS) coordinates to small cell base station 102 in addition to connect request message 110. Alternatively, responsive to receipt of the connect request 110, the small cell base station 102 may issue a request for device coordinates to the mobile device 104.

According to some embodiments, small cell base station 102 may be configured to decline the connection requested by mobile device 104 by transmitting a decline connection message 112 to mobile device 104 upon receiving connect request 110 from mobile device 104. The small cell base station 102 may transmit decline connection message 112 to mobile device 104 on the same frequency or frequencies on which it received connect request message 110. In this manner, mobile device 104 is alerted to lack cellular network access via the small cell base station 102, allowing the mobile device 104 to continue to use the cellular tower 106.

In some embodiments, base station 102 may analyze the device identifier as soon as small cell base station 102 receives the connect request message 110 to determine the identity of the user of mobile device 104. For example, mobile device identifier information may be matched to records on hand correlating device identifiers to known users (e.g., customers). In another example, base station 102 may reference a customer data store of the identified service provider (e.g., over the Internet or cellular network) to determine the identity of the user of mobile device 104 (e.g., cellular telephone number, user information, etc.). In this example, the small cell base station 102 obtains identifying information from a mobile device that it uses to query a customer data store and declines the connection request from mobile device 104. Having declined the connection request from mobile device 104, the small cell base station 102 queries the customer data store to determine a unique identity of the mobile device 104.

In some embodiments, small cell base station 102 may be configured to add the mobile device 104 to a blocked devices list 118 upon receiving the connect request 110 from mobile device 104. This prevents the small cell base station 102, for example, from mistakenly registering the user of mobile device 104 once small cell base station 102 has already received a connect request 110. In this manner, the small cell base station 102 may block the mobile device 104 from repeatedly attempting to connect.

The list of devices registered in the blocked devices list 118, in some embodiments, may be cleared periodically in order to recognize the different visits that a mobile user makes to the region covered by base station 102. For example, each device identifier within the blocked devices list 118 may be associated with a timestamp such that, after a period of time has elapsed (e.g., one hour, one day, etc.), the device identifier may be cleared from the blocked devices list 118. The blocked devices list 118 may be stored in storage 132. Storage 132 may be any electronic storage device unit (e.g., flash memory, solid state hard drive, magnetic hard drive) connected to or otherwise in communication with base station 102.

In some embodiments, mobile device 104 is configured to connect to the Internet by communicating with cell tower 106. Mobile device 104, in this manner, may be capable of communicating with server 108 over the Internet via cell tower 106.

In some embodiments, server 108 includes a wireless transceiver and is located in the same region (e.g., local network range) as small cell base station 102, such that mobile device 104 may connect with server 108 over a wireless network (e.g., via a WiFi™ connection).

In some embodiments, server 108 is connected to a separate wireless device that is located in the same region as small cell base station 102 and is able to connect with server 108 over a wireless network. Such a separate wireless device may be connected, directly or indirectly, to server 108 over a wired connection.

In some embodiments, small cell base station 102 transmits location data identifying one or both of a location of mobile device 104 and a location of small cell base station 102 (e.g., GPS coordinates, base station installation option identifying a deployment location, etc.) and the device identifier of detected mobile device 104 as message 114 to analysis server 108. In other embodiments, the small cell base station 102 may translate the device identifier to a customer identifier (e.g., customer unique identifier, cellular phone number, etc.) prior to transmission of the message 114. The message 114, for example, may be issued via a local area network connection, wide area network connection, or Internet connection to a router 134. In another example, the message 114 may be issued to the router 134 as a cellular communication.

Router 134 may be connected to base station 102 by a wired or wireless connection and may connect to server 108 over a network (e.g., local area network (LAN), wide area network (WAN), the Internet, etc.). Router 134, in some implementations, adds an identifier identifying the small cell base station 102 to message 114 received from base station 102 (e.g., if not added by the base station 102). The router 134 transmits a message 116 which includes at least a portion of the contents of message 114 (e.g., mobile identifier and/or location data) and a small cell base station identifier (e.g., network address of the small cell base station 102) to server 108 over a network (e.g., local area network (LAN), wide area network (WAN), the Internet, etc.). For example, router 134 may be programmed to recognize one or more small cell base stations and identify individual base stations to server 108.

Router 134 may transmit multiple messages such as message 116 for each mobile device detected by small cell base station 102. Router 134 may transmit messages such as message 116 as received from base station 102 (e.g., in real time) to analysis server 108. Router 134, in some implementations, transmits messages such as message 116 periodically to analysis server 108. For example, message 116 may include one or more mobile device identifiers identified by base station 102. Router 134, in a particular example, may transmit messages 116 in real time based upon availability of a network connection with server 108. Should the network connection go down, base station 102 and/or router 134 may collect mobile identifiers to transmit in a batch message to analysis server 108.

In some embodiments, the analysis server 108 matches identifying information associated with the mobile device 104 as provided within message 116 with customer information, for example using a customer identification engine 120. The customer identification engine 120, for example, may cross-reference the mobile identification information within the message 116 with customer data 128c stored within a data store 126. By performing such a correlation, analysis server 108 can immediately identify, for example, the previous purchase history of a customer when that customer walks into range of small cell base station 102. For example, based upon identification of the customer, customer data 128c may be cross-referenced with product data 128d and/or store data 128a to derive purchase patterns of the particular customer.

In some embodiments, the analysis server 108 correlates the identification of the particular customer with a "visit" to a particular location. For example, using a consumer analytics engine 124, the analysis server 108 may log a visit by the particular customer (e.g., identified by customer data 128c) to a particular store identified via the location data within message 116 (e.g., determined by cross-referencing store data 128a). At a later time, for example, the consumer analytics engine 124 can identify a visit frequency based upon information provided by the small cell base station 102 (and, potentially, other small cell base stations associated with a same entity). In some implementations, the consumer analytics engine 124 is periodically used to match purchase history with visit pattern history to identify a frequency of visit within range of the small cell base station 102 in relation to an actual purchase history (e.g., the particular customer makes a purchase each visit, in one out of three visits, etc.).

The consumer analytics engine 124, in some implementations, has the ability to track analytics at the customer level across a number of retailers and/or retail locations (e.g., of a chain operation, etc.) based at least in part upon identification made by two or more small cell base stations. In some embodiments, the customer data 128c includes demographic information such as, in some examples, region (e.g., based upon address, portion of address, area code, and/or region of stores frequented by customer), age information (e.g., age, age range, date of birth, etc.), family information (e.g., number of children, ages of children, spouse, pets, etc.), and income level. At least a portion of the demographic information, for example, may be collected in part when signing the customer up for the loyalty program electronic account or upon installation of a loyalty program mobile application. In some implementations, a portion of the demographic information is derived from purchase habits (e.g., a monthly dog food purchase is indicative of one or more pets, etc.). This information may be used, for example, to present enhanced analytics information to a vendor. In some implementations, the information is analyzed using the Recency Frequency Monetary Value (RFM) method for analyzing customer behavior based upon transactional information.

In some embodiments, responsive to identification of the particular customer, the analysis server 108 matches an offer with the identified customer using an offer matching engine 122. The offer matching engine 122, for example, may correlate one or more of customer data 128c, store data 128a, and product data 128d with offer data 128b to present to the customer (e.g., via a mobile device application, an email message, or an offer presented in real-time at a point of sale device). The offer data 128b, in some examples, may include one or more coupons, promotions, and/or rewards that are each applicable to one or more of customer purchase history, store location, and customer demographics (e.g., as derived via customer data 128c).

In a first example, the offer matching engine 122 may identify offer data 128b related to a particular store promotion, for example based upon the location data provided within the message 116. The promotion, for example, may be identified by cross-referencing the location data with store data 128a and offer data 128b. In a particular example, the offer matching engine 122 may determine that the user of mobile device 104 is visiting a coffee kiosk between 6:00 a.m. and 9:00 a.m. and match a coffee promotion to the visit.

In another example, the offer matching engine 122 may identify one or more offers correlating to past purchase data (e.g., as derived via customer data 128c, cross referenced with product data 128d). For example, the offer matching engine 122 may identify the purchase of a number of sandwiches by the customer, and match the sandwich purchases to a rewards certificate for a discounted or free sandwich.

In a further example, server 108 may receive real time purchase data from a point of sale transaction facility (not shown in FIG. 1) associated with the same organization or store as small cell base station 102. Such purchase data may similarly be cross-referenced, for example using the customer identification engine 120, to correlate purchase information with the customer (e.g., based upon credit card number, consumer rewards program identification, etc.). If the user conducts the purchase via the mobile device 104 (e.g., electronic wallet transaction, electronic coupon, etc.), in another example, the customer identification engine 120 may identify the customer information based upon mobile device identification (e.g., IMSI, MIN, etc.). Based upon purchase data information, for example, the offer matching engine 122 may match current purchase information with a particular offer (e.g., for immediate or later use). In a particular example, the offer matching engine 122 may identify the purchase of a package of baby diapers within the purchase data and match the product to a retailer coupon for diaper wipes.

In some implementations, the analysis server 108 provides offer information 130 to the detected user of mobile device 104. The offer information 130, in some examples, may include one or more of an image file, text data, printer-ready formatted data, and printer instructions (e.g., positioning, formatting, alignment, watermarking, etc.). In other implementations, the offer information 130 contains an identification of an offer. Mobile device 104 may receive offer notifications from the server 108 by means of an electronic mail, automated telephone call or text message. In a particular implementation, analysis server 108 transmits offer information 130 to a mobile application executed on mobile device 104.

In other implementations (not illustrated), the analysis server 108 provides offer information 130 to a retail entity associated with the small cell base station 102. For example, the offer information 130 may be provided for printing at a receipt printer, presented upon a point of sale display, or otherwise communicated at point of purchase at a retail location associated with the small cell base station 102.

In some implementations, the consumer analytics engine 124 provides statistical analysis and reporting of purchase behavior beyond collection of information presented by small cell base stations such as the base station 102. For example, the analysis server 108 may collect information provided by one or more intermediary devices (e.g., point of sale devices, vendor computing systems, online retail systems, etc.), store the information within the database 126, and query the collected information in view of additional database information (e.g., product information, customer information, store information, etc.) to derive business insight. The statistical analysis, in some implementations, is provided by an analytics product or service. For example, the collected data may be imported to an analytics tool such as Google Analytics by Google, Inc. of Menlo, Park or a retail management system (RMS) such as Microsoft Dynamics RMS by Microsoft Corp. of Redmond, Wash. The system 100, in some implementations, includes a customized retail transaction analytics system. For example, the system may include a tool for reviewing transactional data, customer data, store data, and other information through a report-based analytics software tool designed to function with data collected by intermediary devices. A user at a terminal (e.g., browser, monitor attached to the analysis server 108, handheld computing device, desktop computing device, or other computing device capable of presenting graphical analysis information) may review analytics information provided by the analysis server 108 and/or derived from information obtained by the analysis server 108. For further information regarding collection and use of consumer analytics data, see related U.S. patent application Ser. No. 13/599,397, entitled "Apparatus and Method for Collecting and Manipulating Transaction Data" and filed Aug. 30, 2012, incorporated herein by reference in its entirety.

Figure 2:
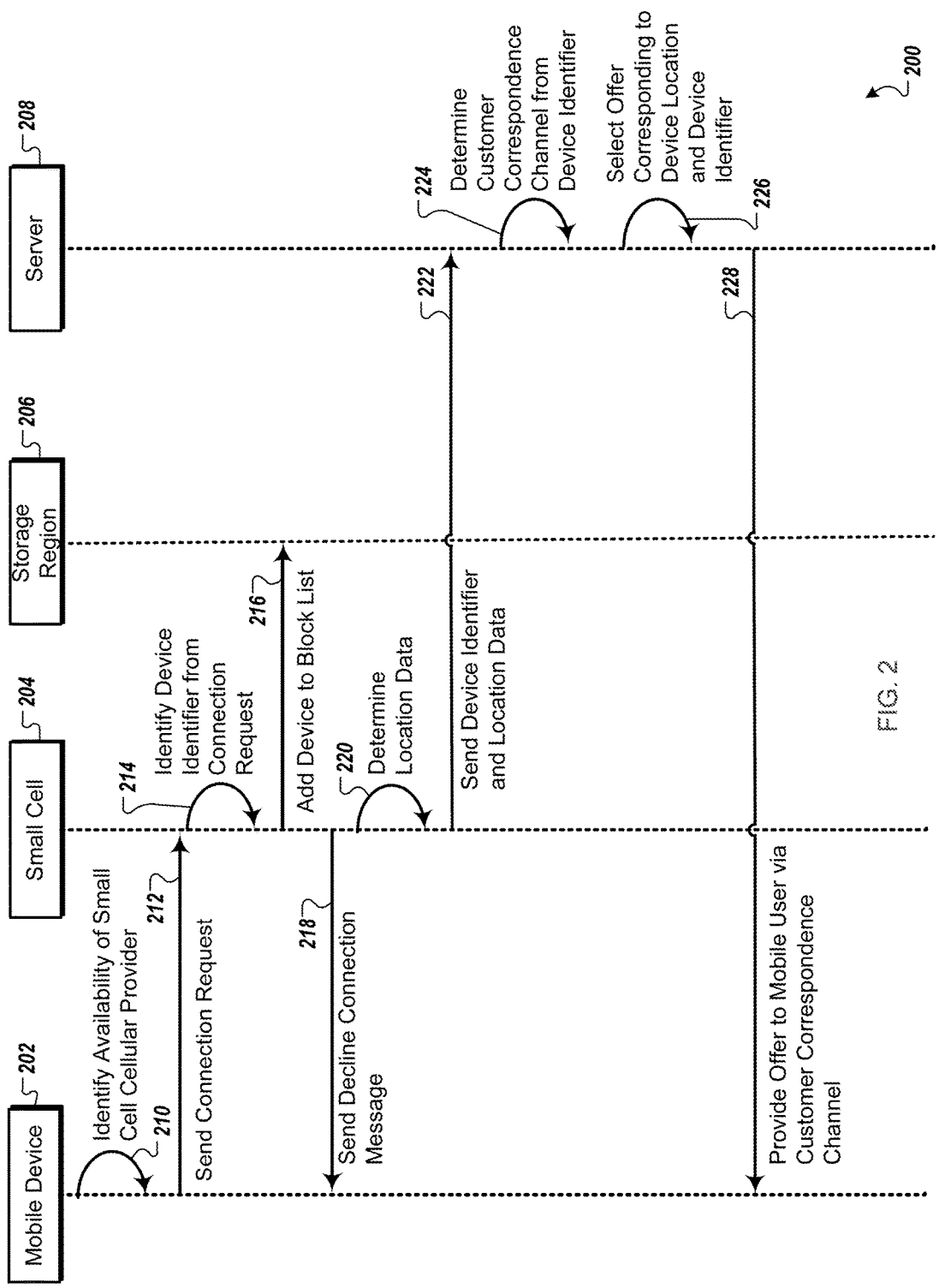
FIG. 2 illustrates a swim diagram of an example method for detecting a mobile user device within range of a small cell base station and providing an offer to the mobile user device from a remote server.

FIG. 2 illustrates a swim diagram of an example method 200 for detecting a mobile user device within range of a small cell base station and providing an offer to the mobile user device from a server. The method 200, in some implementations, includes a mobile device 202 in communication with a small cell 204 and a server 208. The small cell may be in communication with a storage region 206 and server 208. Mobile device 202, small cell 204, storage region 206, and server 208 may correspond to mobile device 104, small cell base station 102, storage device 132, and analytics server 108 as described in relation to FIG. 1, respectively.

In some implementations, the method 200 begins with the mobile device 202 identifying the availability of the small cell base station 204 (210). For instance, mobile device 202 identifies whether small cell base station 204 is within a predefined range of the mobile device 202. Once mobile device 202 identifies that it is within range of small cell 204, mobile device 202 transmits a connection request (212) to small cell 204.

In some implementations, small cell 204 identifies (214) the device identifier from the connection request received from mobile device 202. For instance, small cell 204 may extract the IMSI or MIN information from the connection request 212.

In some implementations, small cell 204 adds mobile device 202 to a block list (216) stored in storage region 206. For example, small cell 204 may add the extracted device identifier of mobile device 202 to a block list of mobile devices maintained in storage region 206. Small cell 204 may be configured to block all communications with any devices listed in the block list on storage region 206. This helps prevent unwanted communication for a set period of time between the small cell 204 and mobile device 202 once small cell 204 has identified a device identifier.

In some implementations, responsive to the connection request issued by the mobile device 202, small cell 204 sends a decline connection message (218) to mobile device 202 to prevent a connection from being established between the small cell 204 and the mobile device 202.

In some implementations, small cell 204 determines location data associated with the connection request (220). For example, small cell 204 may identify its own location by examining a location value hardcoded in its own memory or by determining its own GPS coordinates. In another example, small cell 204 may identify a location of the mobile device 202, for example by estimating a distance from the small cell 204 based upon signal strength, determining location information (e.g., GPS coordinates, etc.) included in the connection request or subsequent communication from the mobile device 202, or deriving location information of the mobile device 202 from an additional source (e.g., cellular provider associated with the mobile device 202, mobile device application executing upon the mobile device 202, etc.). For instance, small cell 204 may receive GPS coordinates from mobile device 104 in the connect request message sent to small cell 204 or immediately in response to the connect request message that identifies the mobile device's position. Once small cell 204 has identified the location information, in some implementations, the small cell 204 transmits the location information (e.g., location of the small cell 204 and/or the mobile device 202) and device identifier of mobile device 202 to server 208 (222).

In some implementations, server 208 is configured to determine the customer correspondence channel, also referred to as a customer communication channel, from the device identifier (224). Server 208, for example, may match the device identifier of mobile device 202 with customer information, such as a customer account associated with a vendor or with a retail analysis system including the server 208. The customer account, for example, may include customer correspondence information (e.g., as provided by the customer). For example, the customer account may be associated with a consumer rewards program, retailer mobile device application, retail analysis system mobile device application, retail online purchase account, or retailer credit card account. The customer correspondence channel may be the customer's preferred mode of contact. For instance, the customer may have previously opted to receive promotional offers by electronic mail. In this case, server 208 may identify the customer's electronic mail address as the customer correspondence channel.

In some implementations, server 208 is configured to select an offer corresponding to the device location and the device identifier (226). For example, server 208 identifies an offer that may be relevant to the user of mobile device 202 and/or the location (e.g., retail vendor) associated with the location information. In a particular example, the server 208 may analyze the past purchase history and/or present purchase data associated with the customer and the retail location to identify an offer custom selected to pique the interest of the customer.

In some implementations, server 208 provides the user of mobile device 202 with the identified offer via the identified customer correspondence channel (228). For instance, server 208 may transmit the identified offer to the user of the mobile device 202 by the customer correspondence channel (e.g., text message, e-mail, mobile application notification) previously identified by server 208. Although illustrated as being received by the mobile device 202, in other embodiments, the user of the mobile device 202 receives the offer via a different means (e.g., logging into an account via a personal computer, presented the offer at a point-of-sale at a retail location, etc.).

Although the method 200 has been described in relation to a series of steps performed in an example order, in other implementations, one or more of the steps of the method 200 may be performed in a different order and/or in parallel, and one or more steps may be added to the method 200. Furthermore, one or more of the steps of the method 200, in other implementations, may be combined or removed. Other modifications of the method 200 are possible without straying from the intent and purpose of the method 200.

Figure 3:
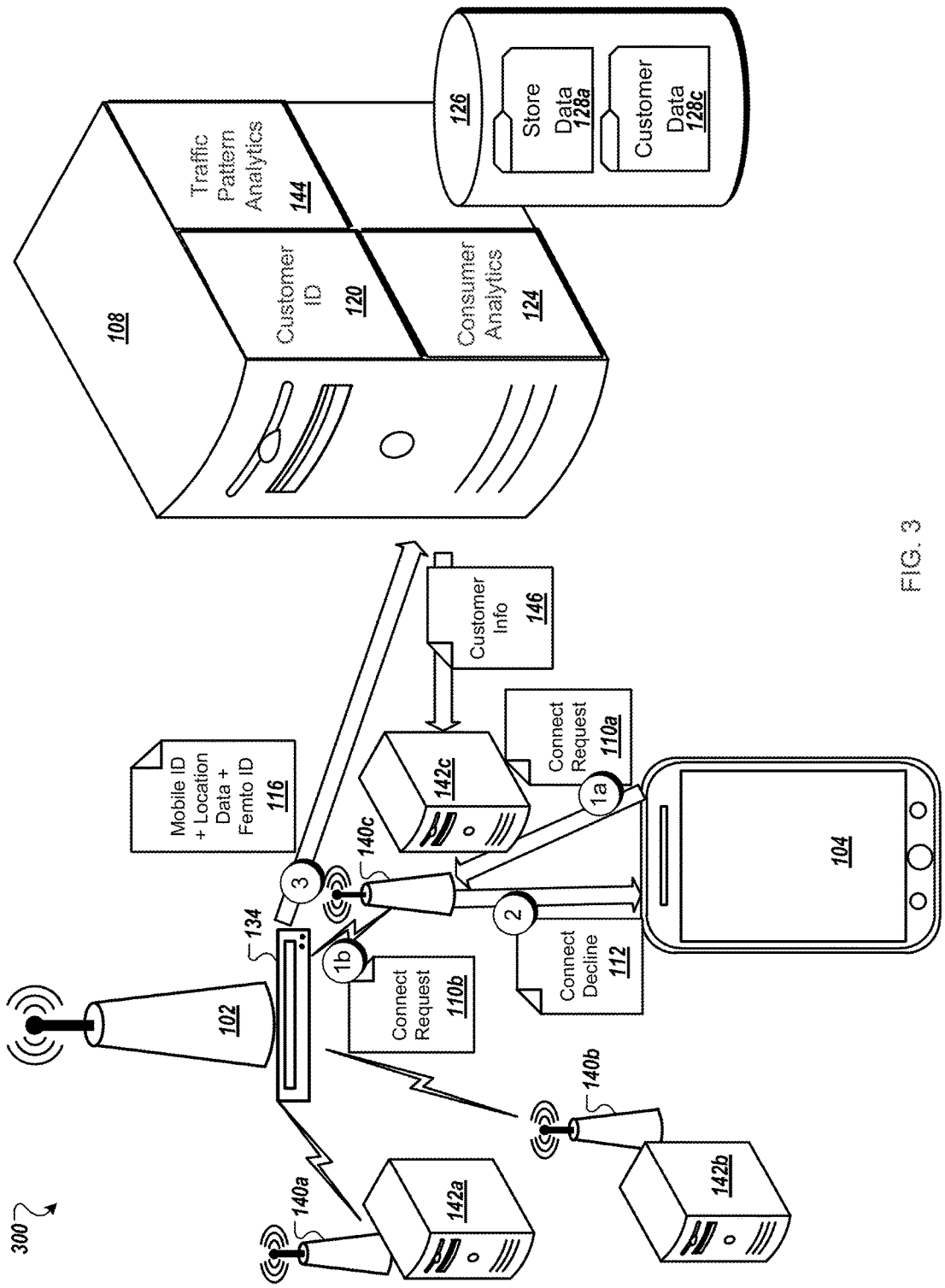
FIG. 3 is a block diagram of an example system for collecting and manipulating user data using a plurality of small cell base stations.

FIG. 3 illustrates a block diagram of another example system 300 for collecting and manipulating user data from a network of small cell base stations. Small cell base stations 140*a*, 140*b*, and 140*c* communicate with analysis server 108 via the central base station 102. Small cell base stations 140*a*, 140*b*, and 140*c* may be located at geographically different locations within the range of communication of base station 102. In this manner, for example, a network of base stations 140 may feed information to a master base station 102. Deployment of the network of small cell base stations 140, for example, may be arranged for traffic pattern monitoring reasons or to cover multiple areas (e.g., storefronts, buildings, kiosks, rooms, etc.) in a larger space maintained by a single entity. In some examples, the network of base stations 140 may be deployed within a shopping mall, museum, sporting arena, school campus, theme park, or resort.

In some implementations, the base stations 140 include a different configuration than the base station 102. For example, the small cell base stations 140*a*, 140*b*, and 140*c* may be in communication with electronic computing devices 142*a*, 142*b*, and 142*c*, respectively to maintain individual data records and/or receive individual instructions (e.g., offer information, etc.) relevant to the base station 142 itself or to the mobile device 104 connecting to the base station 142. Conversely, the base station 102 may be configured for relaying information to a server (e.g., via an IP communications network), while the base stations 142 may be cellular-only devices.

In some implementations, electronic computing devices 142*a*, 142*b*, and 142*c* are configured as electronic storage device units (e.g., flash memory, solid state hard drive, magnetic hard drive) connected to or otherwise in communication with the small cell base stations. In another implementation, electronic computing devices 142*a*, 142*b*, and 142*c* include a storage device and processing circuitry (e.g., for passing information, identifying customer information based upon device identifier, etc.). In a particular example, the electronic computing devices 142 may be part of a point of sale system or other entity-maintained consumer-oriented software system.

As identified above, in some implementations, only base station 102 is connected to router 134 for communication via an IP network. Router 134 may be connected to base station 102 by a wired or wireless connection and may connect to server 108 over a network (e.g., local area network (LAN), wide area network (WAN), the Internet, etc.). In order to minimize the amount of equipment and processing power necessary at each small cell base station node 142 of the small cell base station network to handle communication between each base station and router 134, each of the small cell base stations 140*a*, 140*b*, and 140*c* may be configured to communicate with each other and/or with small cell base station 102. Base station 102 may be configured to collect data from each of small cell base stations to send to analysis server 108 through router 134. In an implementation, base station 102 transmits information collected from each of the small cell base stations 142 to analysis server 108 periodically. In other implementations, base station 102 waits until it has received a certain amount of data from small cell base stations 140*a*, 140*b*, and 140*c* to communicate with analysis server 108 or issues transmissions on a periodic basis.

In some implementations, each of the small cell base stations 140*a*, 140*b*, and 140*c* is configured to receive connect requests such as request 110*a* from mobile user device 104. Upon receiving such a connection request, each of the small cell base stations 140*a*, 140*b*, and 140*c* may extract a unique device identifier (e.g., of mobile user device 104) from connection request 110*a* to uniquely identify the mobile user device. Small cell base stations 140*a*, 140*b*, and 140*c* may transmit a connection decline message 112 to mobile user device 104.

Once the small cell base stations 140 have collected unique identifier information from mobile device 104, these small cell base stations 140 may be configured to add mobile device 104 to a list of blocked devices for a specific period of time in order to avoid mobile device 104 from initiating a connection every time it wanders within range of a small cell base station 140 that has already acquired its unique identifier. Small cell base stations 140*a*, 140*b*, and 140*c* may store such block lists in their respective electronic computing devices 142. The list of devices registered in the blocked devices list may be cleared periodically in order to recognize the different visits that a mobile user may make to the regions covered by the small cell base stations 142. For example, each device identifier within the blocked devices list may be associated with a timestamp such that, after a period of time has elapsed (e.g., one hour, one day, etc.), the device identifier may be cleared from the blocked devices list.

The timing associated with clearing the blocked devices list, in some implementations, is configurable. For example, timing for clearance of the blocked list may vary depending upon the purpose of the network configuration. A system administrator of small cell base stations 140 may set the amount of time for which a device identifier should remain on a blocked list in order to accommodate for a shopper returning to the same location (e.g., store) within a threshold period of time (e.g., few minutes, half hour, etc.) of the connection request message. For example, to identify traffic patterns of a shopper within a wholesale warehouse, the blocked devices list may be cleared every 5 minutes to accommodate for backtracking of consumers while browsing the store. In another example, to identify traffic patterns of a visitor within a State Fairgrounds, the blocked devices list may be cleared every half hour.

In some implementations, each of small cell base stations 140*a*, 140*b*, and 140*c* transmits information received in the connection request 110*a* to base station 102 in a connection request 110*b*. Base station 102, for example, may extract the location of the small cell base station and its identity from connect request message 110*b*. Base station 102 may append location and identifier information for the small cell base station 140*b* which issued the connect request 110*b* before sending such information analysis server 108. This, for example, can be used to track, at analysis server 108, which small cell base station in network 300 issued particular information.

Base station 102 generates and transmits message 116 to analysis server (e.g., via router 134). Message 116 may include identification information extracted mobile device 104, location data from the small cell base station 140*b* that has sent information to base station 102, and the identification information of the small cell base station 140*b*.

In some implementations, each of small cell base stations 140*a*, 140*b*, and 140*c* alerts base station 102 that mobile device 104 has entered its range. Small cell base stations 140*a*, 140*b*, and 140*c* may transmit the location of mobile device 104 to base station 102. Small cell base stations may extract the location information from the mobile device identifier and transmit that location information to base station 102. In some implementations, small cell base stations 140*a*, 140*b*, and 140*c* may also transmit their own location information to base station 102. For example, computing devices 142*a*, 142*b*, and 142*c* may contain a stored GPS coordinate for the small cell base stations with which they are associated. Once small cell base stations 140*a*, 140*b*, and 140*c* have generated message 110*b*, computing devices 142*a*, 142*b*, and 142*c* may forward the location of their associated small base station to base station 102.

Router 134 may transmit multiple messages such as message 116 for each mobile device detected by the small cell base stations 140. Router 134 may transmit messages such as message 116 as received from base station 102 (e.g., in real time) to analysis server 108. Router 134 may, in some implementations, transmit messages such as message 116 periodically to analysis server 108. For example, message 116 may include one or more mobile device identifiers identified by the small cell base stations 140. Router 134, in a particular example, may transmit messages 116 in real time based upon availability of a network connection with server 108. Should the network connection go down, base station 102 and/or router 134 may collect messages transmitted from the small cell base stations 140 to transmit in a batch message to analysis server 108.

In some implementations, the analysis server 108 tracks user traffic through the network of small cell base stations 140. For example, using a traffic pattern analytics engine 144, the analysis server 108 may log a visit by a particular consumer at a particular small cell base station 140. When a mobile user device 104 enters the coverage area of a small cell base station 140, the small cell base station 140 is able to extract mobile device identifier and may log its presence with the online server via base station 102 and/or router 134. The user of mobile user device 104 may wander from the service area of small cell base station 140*a* to the service area of small cell base station 140*b*. Base station 102 may receive visit information from small cell base station 140*a* with a timestamp of when the mobile user device 104 entered the service area of small cell 140*a*. Base station 102 logs such visit information with server 108. When the user of mobile user device 104 enters into the service area of small cell base station 140*b*, mobile user device 104 attempts to connect to small cell base station 140*b* and may send a connect request message 110*a* to small cell base station 140*b*. Small cell base station 140*b* may extract the device identifier and location information from received message 110*a* and may forward this information to base station 102 as message 110*b*. Base station 102 may append the received message 110*b* with location information and an identifier to indicate that the message originated from small cell base station 140*b*. Base station 102 may then transmit message 116, a modified version of received message 110*b*, to server 108.

In some implementations, analysis server 108 identifies the customer associated with a message from base station 102. Customer identification engine 120 may correlate the device identifier received from base station 102 with a customer profile. The customer profile may be maintained in storage 126 as customer data 128*c*. Customer identification engine 120 may query a wireless service provider database, using the device identifier received in message 116, to determine identification and user profile information for the user associated with mobile user device 104. In other implementations, the analysis server 108 identifies and logs information regarding individual mobile devices based upon the mobile device identifier alone (e.g., as provided within the message 116). In this manner, for example, traffic patterns may be established by tracking users of mobile devices anonymously In some implementations, analysis server 108 tracks consumer traffic patterns throughout the network of small cell base stations 142 via a traffic pattern analytics engine 144. Upon identifying customer information associated with each message 116, for example, server 108 may extract and store visit information (e.g., location and time of visit) as customer data 128*c* in storage 126. Traffic pattern analytics engine 144 may analyze the visit information for each customer from the log of all visits the user has made by examining customer data 128*c*. Traffic pattern analytics engine 144 may monitor the frequency of visits of each customer to a particular location, which areas are most frequently visited by a particular customer throughout the network of small cell base stations 140, and the average amount of time the user spends in each area. Traffic pattern analytics engine 144 may also determine the order of traffic flow through the network of small cell base stations 140. For example, small cell base stations 140 may be associated with individual stores in a shopping center. Traffic pattern analytics engine 144 may determine that a particular customer visits a video game store first and then proceeds to a sporting goods store on a typical visit to the shopping center by examining several visits of the particular customer to the shopping center. Traffic pattern analytics engine 144 may determine that the customer spends twice the amount of time in the video game store than in the sporting goods store.

In some implementations, traffic pattern analytics engine 144 observes traffic patterns of several different customers together. For example, traffic pattern analytics engine 144 may observe patterns in which stores most customers spend the longest period of time and the shortest period of time. Traffic pattern analytics engine 144 may also determine which stores users typically "window shop" in by associating purchase data along with traffic pattern data. Traffic pattern analytics engine 144 may also determine the types of stores a particular demographic spends more time in. For example, traffic pattern analytics engine may determine that teenage boys spend more time in video game stores than any other stores and that teenage girls spend more time in stores catering to fashion accessories by correlating traffic activity of several customers along with customer data 128*c* for each of these customers, which identifies the demographic information for each customer. Additionally, traffic pattern analytics engine 144 may also determine which areas of the small cell base station network customers spend more time during a particular time of the year, a particular time of day, etc. For instance, traffic pattern analytics engine 144 may determine that most customers in the shopping center enter the food court around noon or that many customers visit jewelry stores in the days preceding immediately preceding Valentine's Day.

Consumer analytics engine 124 may identify that a particular customer tends to visit a particular area or store within the shopping complex at a particular time. For example, consumer analytics engine 124 may determine that mobile device 104 is in the service area of a small cell base station for a food court around noon during each of the customer's visits to the shopping center. Based on such customer activity, the consumer analytics engine 124 may offer the customer particular offers for lunch at stores in the food court around noon. For example, consumer analytics engine 124 may determine that a customer has entered the shopping center as soon as it receives a message 116 indicating that the customer is present at one of the small cell base stations in the shopping center before noon. Accordingly, consumer analytics engine 124 may transmit a notification message to the user of mobile device 104 of such a lunch deal shortly before noon.

In some implementations, traffic pattern analysis and customer analysis data generated by the analysis server 108 are transmitted to vendors associated with the small cell base stations 140 of network 300. For instance, the stores that have installed such small area base stations 140 in the shopping center may gain valuable insights into consumer behavior by obtaining such consumer and traffic pattern data. Server 108 may store such traffic pattern data for a particular retail store as store data 128*a*. Server 108 may store customer specific analytics data for a particular customer as customer data 128*c*. Server 108 may transmit one or both of store data 128*a* and customer data 128*c* to electronic databases or email addresses for the various organizations (e.g., retail stores) associated with each of the small cell base stations 140.

In some implementations, the analysis server 108 provides information directly to a computing device 142 associated with one of the small base stations 140 of the network, for example alerting the retailer of the consumer's presence in the range of the particular small base station. As illustrated, customer information 146 may be provided by the server 108 to the computing device 142*c* regarding detection of the customer associated with the mobile device 104. The retailer, for example, may provide enhanced services on behalf of the identified customer such as, in some examples, preparing a take-out food purchase order for immediate pick-up, pulling up a customer's information at a service desk to aid in a transaction, or printing tickets for pick-up at a will-call counter.

Although illustrated as a network of small cell base stations 140 in communication with the main base station 102, in other implementations, the traffic pattern analytics engine 144 analyzes traffic patterns of identified consumers across small cell base stations deployed in disparate locations. For example, a chain of gas stations may monitor customer traffic patterns within particular cities, counties, states, or even interstate traffic to better understand customer behaviors.

Figure 4:
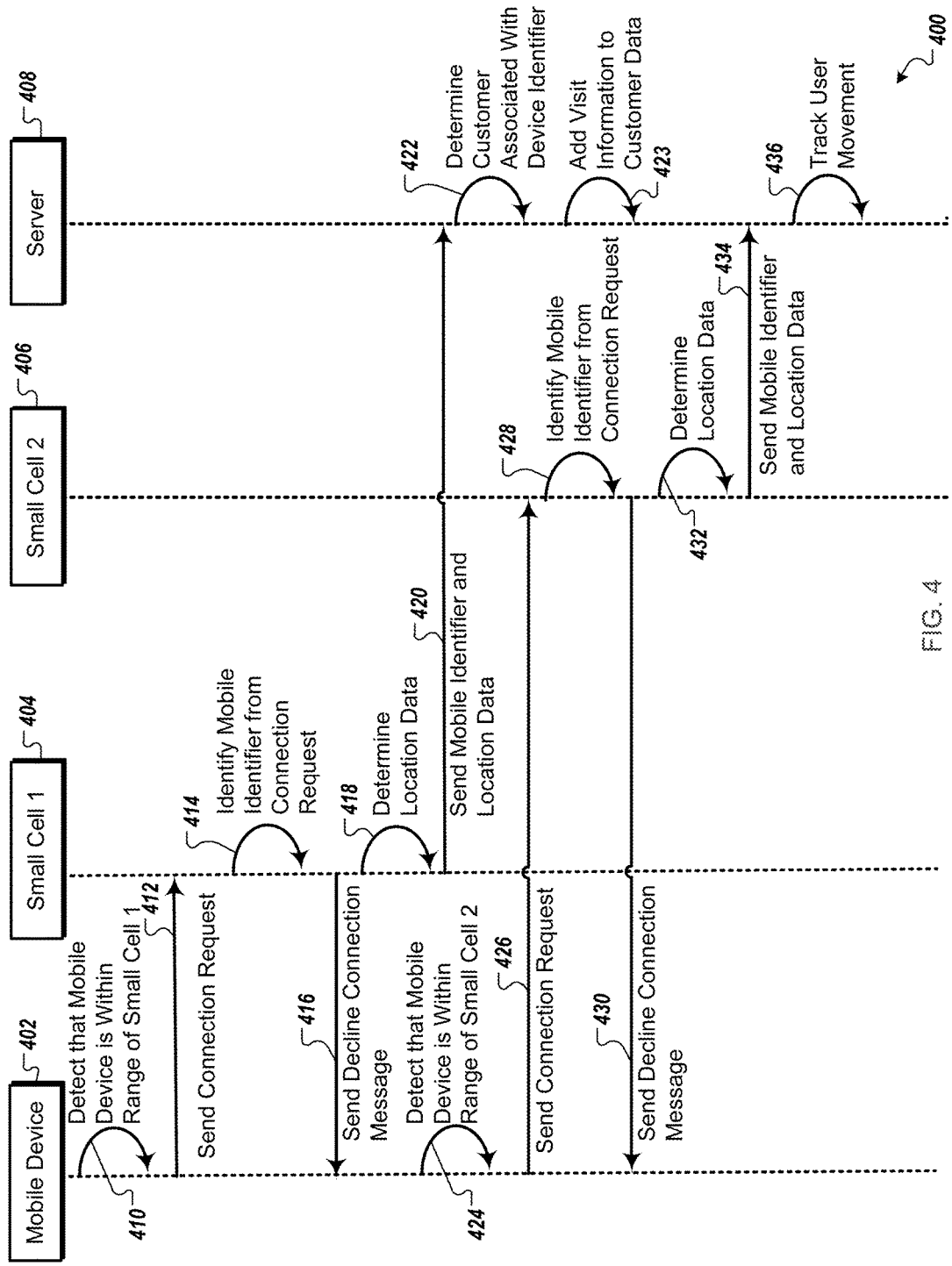
FIG. 4 illustrates a swim diagram of an example method for detecting a mobile user device moving from the coverage range of one small cell base station to another small cell base station.

FIG. 4 illustrates a swim diagram of an example method 400 for detecting a mobile user device within a network of small cell base stations and tracking the movement of the mobile user device within the network. The method 400, in some implementations, includes a mobile device 402 moving into communication first with a first small cell 404 and then with a second small cell 406, while the first small cell 404 and the second small cell 406 are in communication with a server 408. Mobile device 402, first small cell 404, second small cell 406, and server 408, for example, may correspond to mobile device 104, small cell base station 140*a*, small cell base station 140*b*, and analytics server 108 as described in relation to FIG. 3, respectively.

In some implementations, the method 400 begins with the mobile device 402 identifying the availability of the first small cell base station 404. For instance, mobile device 402 identifies that it is within communication range of the first small cell base station 404. Once mobile device 402 identifies that it is within range of small cell 404, mobile device 402 transmits a connection request (412) to first small cell 404.

In some implementations, first small cell 404 identifies (414) the device identifier from the connection request received from mobile device 402. For instance, small cell 404 may extract the IMSI or MIN information from the connection request 412.

In some implementations, small cell 404 adds mobile device 402 to a block list (not shown in FIG. 4). For example, small cell 404 may add the extracted device identifier of mobile device 402 to a block list of mobile devices maintained in a storage region. Small cell 404 may be configured to block all communications with any devices listed in the block list. This helps prevent unwanted communication for a set period of time between the small cell 404 and mobile device 402 once small cell 404 has identified a device identifier. In some implementations, responsive to the connection request issued by the mobile device 402, small cell 404 sends a decline connection message (416) to mobile device 402 to prevent a connection from being established between the small cell 404 and the mobile device 402.

In some implementations, small cell 404 determines location data associated with the connection request (418). For example, the first small cell 404 may identify its own location by examining a location value hardcoded in its own memory or by determining its own GPS coordinates. In another example, small cell 404 may identify a location of the mobile device 402, for example by estimating a distance from the first small cell 404 based upon signal strength, determining location information (e.g., GPS coordinates, etc.) included in the connection request or subsequent communication from the mobile device 402, or deriving location information of the mobile device 402 from an additional source (e.g., cellular provider associated with the mobile device 402, mobile device application executing upon the mobile device 402, etc.). Once first small cell 404 has identified the location information, in some implementations, the small cell 404 transmits the location information (e.g., location of the small cell 404 and/or the mobile device 402) and device identifier of mobile device 402 to server 408 (420).

In some implementations, server 408 is configured to determine customer information from the device identifier (422). Server 408, for example, may match the device identifier of mobile device 402 with customer information, such as a customer account associated with a vendor or with a retail analysis system including the server 408. The customer information may be prior data logged "anonymously" regarding the device identifier itself. If a customer is not identified in relation to the device identifier, in some implementations, the device identifier is added as a new identifier within device monitoring records.

In some implementations, the server 408 adds visit information (e.g., location data, timestamp, etc.) related to the information provided by the first small cell 404 to the customer information. For example, the server 408 may record individual visits within range of a number of small cell base stations, such as the first small cell 404 and the second small cell 406.

In some implementations, the mobile device 402 identifies entry within range of the second small cell base station 406 (424). Once mobile device 402 identifies that it is within range of small cell 406, mobile device 402 transmits a connection request (426) to small cell 406.

In some implementations, small cell 406 identifies (428) the device identifier from the connection request received from mobile device 402. For instance, small cell 406 may extract the IMSI or MIN information from the connection request 426.

In some implementations, small cell 406 adds mobile device 402 to a block list associated with small cell 406 (not shown in FIG. 4). For example, small cell 406 may add the extracted device identifier of mobile device 402 to a block list of mobile devices maintained in a storage region. Small cell 406 may be configured to block all communications with any devices listed in the block list. This helps prevent unwanted communication for a set period of time between the small cell 406 and mobile device 402 once small cell 406 has identified a device identifier. For instance, once mobile device 402 is listed on the block list, small cell 406 may decline all connect request messages instantaneously from mobile device 402 without reviewing identifying information from mobile device 402. In some implementations, responsive to the connection request issued by the mobile device 402, small cell 406 sends a decline connection message (430) to mobile device 402 to prevent additional connection requests from the mobile device 402.

In some implementations, small cell 406 determines location data associated with the connection request (432). For example, the second small cell 406 may identify its own location by examining a location value hardcoded in its own memory or by determining its own GPS coordinates. In another example, small cell 406 may identify a location of the mobile device 402, for example by estimating a distance from the second small cell 406 based upon signal strength, determining location information (e.g., GPS coordinates, etc.) included in the connection request or subsequent communication from the mobile device 402, or deriving location information of the mobile device 402 from an additional source (e.g., cellular provider associated with the mobile device 402, mobile device application executing upon the mobile device 402, etc.). Once second small cell 406 has identified the location information, in some implementations, the small cell 406 transmits the location information (e.g., location of the small cell 406 and/or the mobile device 402) and device identifier of mobile device 402 to server 408 (434).

In some implementations, server 408 tracks user movement through the network of small cell base stations (436). For example, the server 408 determines that mobile device 402 has left the area associated with small cell 404 and has entered the region associated with small cell 406. Server 408 may identify at what time mobile device 402 entered the region associated with each small cell. Server 408 may also identify or estimate an amount of time mobile device 402 spent in range of each small cell.

Although the method 400 has been described in relation to a series of steps performed in an example order, in other implementations, one or more of the steps of the method 400 may be performed in a different order and/or in parallel, and one or more steps may be added to the method 400. Furthermore, one or more of the steps of the method 400, in other implementations, may be combined or removed. Other modifications of the method 400 are possible without straying from the intent and purpose of the method 400.

Figure 5:
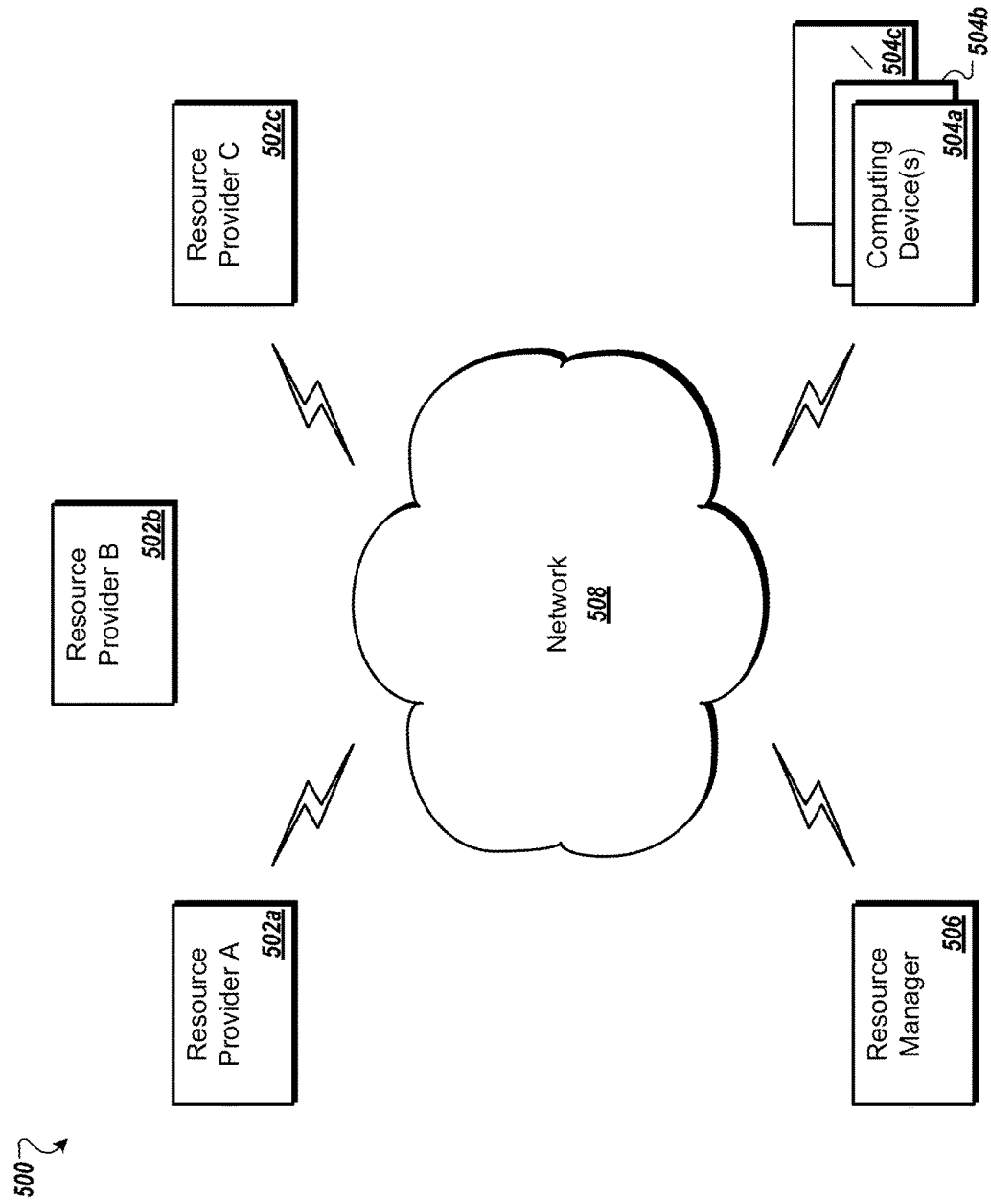
FIG. 5 is a block diagram of an example network environment for collecting, manipulating and analyzing customer data.

As shown in FIG. 5, an implementation of an exemplary cloud computing environment 500 for collecting and manipulating user data using a small cell base station data is shown and described. The cloud computing environment 500 may include one or more resource providers 502a, 502b, 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
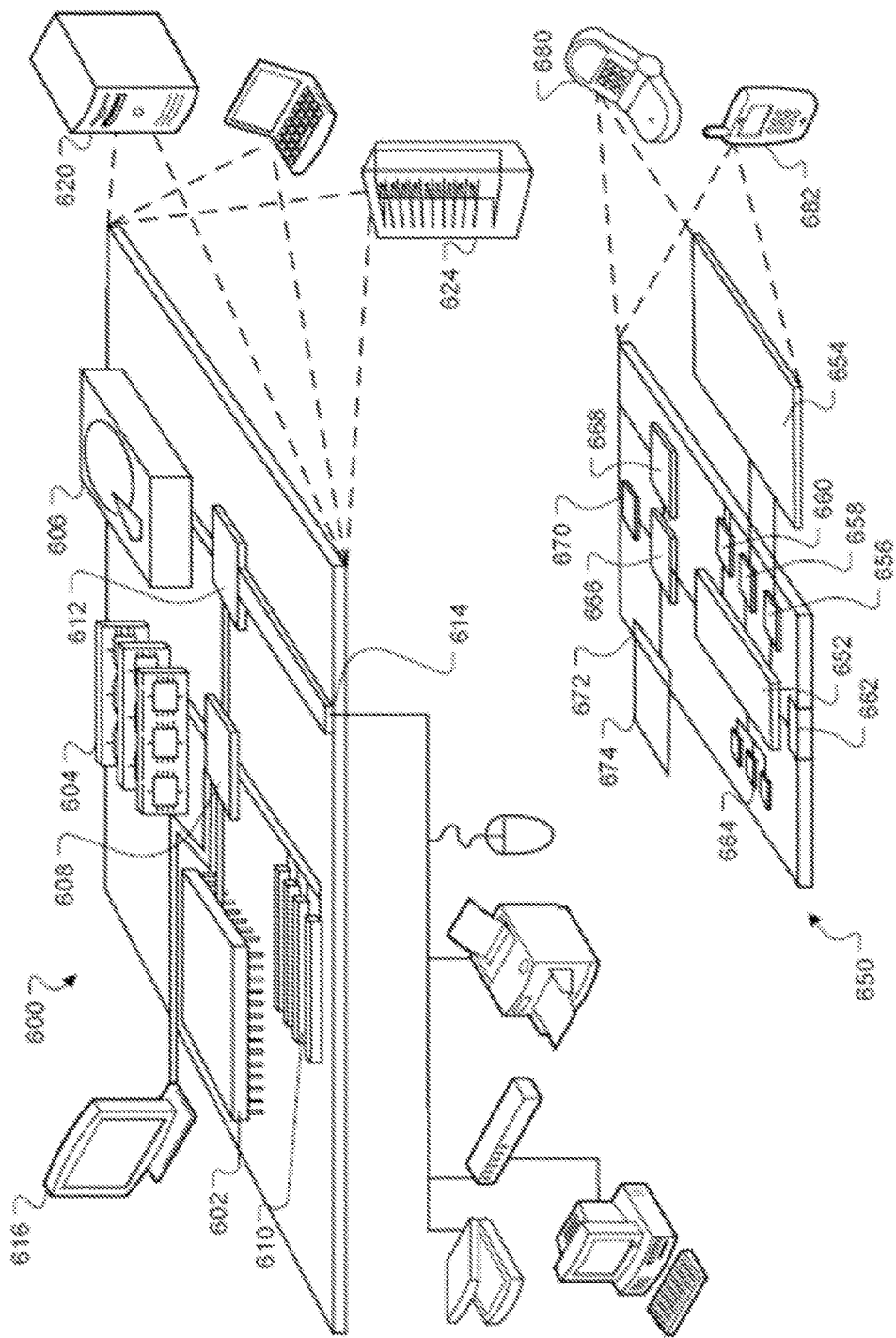
FIG. 6 is a block diagram of a computing device and a mobile computing device used to implement the techniques described in this disclosure.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk. The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 850, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. That the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, an apparatus and method for collecting and manipulating transaction data are provided. Having described certain implementations of methods and apparatus for collecting and manipulating user data using a small cell base station, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method for identifying a plurality of mobile devices within a vicinity, the method comprising:

receiving, by a small cell base station, a connection request issued by a mobile device via cellular transmission;

identifying, by a processor of the small cell base station, a device identifier associated with the connection request, the device identifier being associated with the mobile device that issued the connection request;

determining, by the processor, whether the device identifier is unique in light of a listing of previously recognized device identifiers;

responsive to determining that the device identifier is unique, adding, by the processor, the device identifier to the listing of previously recognized device identifiers, wherein adding the device identifier comprises associating the device identifier with at least one of a timestamp and an expiration;

responsive to determining that the device identifier is unique, transmitting, by the processor, the device identifier to a remote server operating an offer matching engine, wherein the offer matching engine operates software to correlate one or more of customer data, store data, and product data with offer data to calculate promotional offer data;

transmitting, by the remote server, the promotional offer data to the mobile device; and transmitting, to the mobile device, in response to the cellular transmission, a connection decline message, preventing a connection being established between the small base station and the mobile device and causing the mobile device to remain connected to a cellular network of a cellular tower.

2. The method of claim 1, comprising periodically clearing the listing of previously recognized device identifiers to different multiple visits by a user of the mobile device to the vicinity using the at least one of a timestamp and an expiration.

3. The method of claim 1, comprising causing, by the processor, identification of a telephone number of the mobile device associated with the device identifier.

4. The method of claim 3, wherein the identified telephone number is employed to send promotional offer data to the mobile device.

5. The method of claim 1, wherein the device identifier comprises an international mobile subscriber identity (IMSI) or mobile identification number (MIN).

6. The method of claim 1, comprising causing, by the processor, identification of a customer associated with the device identifier.

7. The method of claim 6, wherein causing identification of the customer comprises providing, via a network to a remote computing device, at least the device identifier.

8. The method of claim 7, wherein the network is a cellular network and the remote computing device is a remote small cell base station.

9. The method of claim 7, wherein providing the device identifier comprises providing location information identifying a location of at least one of the mobile device and the small cell base station.

10. The method of claim 9, wherein the location information comprises an identifier associated with the small cell base station.

11. The method of claim 6, wherein causing identification of the customer comprises issuing a request to a cellular provider for conversion of the device identifier to a telephone number.

12. The method of claim 1, comprising, after a predetermined time related to the at least one of the timestamp and the expiration has elapsed, removing, by the processor, the device identifier from the listing of previously recognized device identifiers.

13. A mobile-device identification cell comprising:
a processor; and
a memory having instructions stored thereon, wherein the instructions, when executed by the processor, cause the processor to:
   receive a connection request issued by a mobile device via cellular transmission;
   identify a device identifier associated with the mobile device that issued the connection request;
   determine whether the device identifier is unique in light of a listing of previously recognized device identifiers;
   responsive to determining the device identifier is unique, add the device identifier to the listing of previously recognized device identifiers, wherein adding the device identifier comprises associating the device identifier with at least one of a timestamp and an expiration; and
   transmit, to the mobile device, in response to the cellular transmission, a connection decline message, preventing a connection being established between the small base station and the mobile device and causing the mobile device to remain connected to a cellular network of a cellular tower.

14. The mobile-device identification cell of claim 13, wherein the instructions, when executed, further cause, responsive to determining that the device identifier is unique, a transmission of the device identifier to a remote server that sends promotional offer data to the mobile device using the device identifier.

15. A system for identifying a plurality of mobile devices within a vicinity, the system comprising:
a plurality of small cell base stations, wherein each small cell base station comprises a memory having first instructions stored thereon, wherein the first instructions, when executed by a processor of the respective small cell base station, cause the processor to
   receive a connection request to the small cell base station issued by a mobile device via cellular transmission,
      identify a device identifier associated with the connection request,
      determine whether the device identifier is unique in light of a listing of previously recognized device identifiers,
      responsive to determining the device identifier is unique, add the device identifier to the listing of previously recognized device identifiers, wherein adding the device identifier comprises associating the device identifier with at least one of a timestamp and an expiration,
      transmit, to the mobile device, in response to the cellular transmission, a connection decline message, preventing a connection being established between the small base station and the mobile device and causing the mobile device to remain connected to a cellular network of a cellular tower, and
   provide, via a network to a remote central processing system, at least the device identifier; and
the remote central processing system comprising a memory having second instructions stored thereon, wherein the second instructions, when executed by a processor of the central processing system, cause the central processing system to
   receive, via the network, a plurality of communications from the plurality of small cell base stations, wherein each communication of the plurality of communications comprises the device identifier of a given mobile device and location information of a given small cell base station,
   identify, for each communication of the plurality of communications, customer information associated with the mobile device identification information,
   store, as visit information corresponding to a location associated with the location information, the location information,
   identify, by operating an offer matching engine, at least one offer, wherein the at least one offer is selected based upon at least one of the customer information and the location information; and provide, for review by a customer corresponding to the customer information, the at least one offer.

16. The system of claim 15, wherein the at least one offer is provided to a point of sale device associated with the location.

17. The system of claim 15, wherein the second instructions, when executed by the processor of the central processing system, cause the central processing system to:
determine a communication channel associated with the customer information; and
provide the at least one offer via the communication channel.

18. The system of claim 17, wherein the communication channel comprises a mobile application.

* * * * *